Patented Feb. 17, 1948

2,436,073

UNITED STATES PATENT OFFICE 2,436,073

SYNTHESIS OF SUBSTITUTED PTERIDINS

John H. Mowat, Pearl River, N. Y., assignor, by mesne assignments, to American Cyanamid Company, New York, N. Y., a corporation of Maine No Drawing. Application November 29, 1945, Serial No. 631,787

8 Claims. (Cl. 260—251)

This invention relates to a new method of preparing organic compounds possessing biological activity.

I have discovered that a mixture of 2,4,5-triamino-6-hydroxypyrimidine, a halopyruvic aldehyde and aminobenzoic acid, or one of its salts, esters, or amides may be caused to react to yield an important group of new compounds having biological activity. The reaction may be illustrated by the following equation:

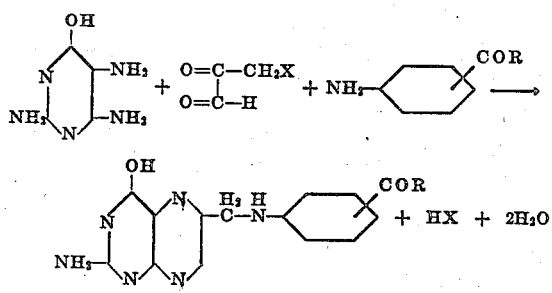

in which X is halogen and R is —OH, —OR', or —NR" R'", R' being an alkyl radical and R" and R'" being hydrogen, aliphatic or aromatic radicals.

Generally speaking, the compounds prepared by the process of the present invention are yellow to reddish-brown crystalline solids, difficultly soluble in water and organic solvents. Some possess vitamin-like properties and appear to be necessary for, or stimulate the growth of, certain bacteria and higher forms of animal life. Some are also useful in stimulating haemoglobin formation and in the treatment of agranulocytosis. Some of the compounds which may be prepared by the process described and claimed herein appear to possess anti-vitamin properties and are useful for this reason. Other compounds in the series possess properties which make them of value in still other ways.

Of the reactants, 2,4,5-triamino-6-hydroxypyrimidine is a known compound and may be prepared by methods which have been described in the chemical literature. As is also well known, this compound may exist in one or more tautomeric forms, such as:

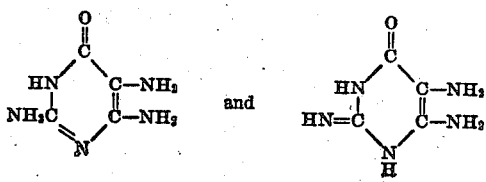

and etc. Whether or not the compound exists in the keto form or the enol form probably depends upon the pH of the medium in which it is dissolved. In acid media the compound most likely exists in keto form whereas in alkaline media it exists as the enol form. It will also be noted that the 2-amino group may also be tautomeric with an imino group. As will be understood by those in the art, any of the tautomeric forms may be used in the same chemical reactions in like manner and reference hereinafter to the use of one tautomeric form includes the use of the others. Obviously, the final product may exhibit the same kind of tautomerism.

The preferred halopyruvic aldehyde is bromopyruvic aldehyde, although other halopyruvic aldehydes can be used, such as chloropyruvic aldehyde. It will also be noted that acetals of halopyruvic aldehydes may be used in the reaction. As an equilibrium exists between the free aldehyde and its acetal in solution, it is believed that the actual reactant is the aldehyde itself. Accordingly, when reference is made hereinafter, and in the claims, to the use of a halopyruvic aldehyde, such reference is intended to include the equivalent use of the corresponding halopyruvic aldehyde acetals. Inasmuch as these halopyruvic aldehydes and acetals appear to be new a method of preparing them is described herein.

The aminobenzoyl reactants include any ortho, meta, or para-aminobenzoic acid, and salts, esters, and amides and other related derivatives thereof. The biological activity of the resulting product depends, in large measure, upon the particular aminobenzoyl compound employed in the reaction. For example, when p-aminobenzoic acid or its salts are used, the resulting product is biologically active as an essential growth factor for Streptococcus fecalis R but is, however, inactive with certain other organisms for which other compounds of the invention show activity.

The compounds that are formed when using esters of p-aminobenzoic acid, such as the methyl, ethyl, butyl, benzyl, and the like, esters, do not appear to possess the same biological activity, being ineffective in promoting the growth of Streptococcus fecalis R and certain other organisms with which these compounds have been tested at the present time. It is possible, however, that these particular compounds may be of value in experimental medicine in other ways.

An important group of compounds prepared by the process of the present invention are those obtained when using as intermediates the amides of aminobenzoic acid. These intermediates include ortho, meta, and para-aminobenzamide and other amides in which R'' and/or R''', in the general formula, may be hydrogen, aliphatic, or aromatic radicals, such as ethyl, ethanol, dodecyl, ethylhexyl, benzyl, phenyl, etc., or those in which R'' and R''' together form a closed ring.

Of the various aminobenzoic acid amides that may be employed as intermediates, the most important appear to be those of amino acids, particularly of glutamic acid, as, for example, p-aminobenzoylglutamic acid and polypetides thereof such as p-aminobenzoylglutamylglutamic acid, p-aminobenzoylglutamylglutamylglutamic acid and others having a plurality of peptid linkages made up of one or more of the various amino acids, such as p-aminobenzoylglutamylglycylglutamic acid. Compounds prepared with these intermediates have a wider range of biological activity and are the preferred products of the present invention. Of course, amides of p-aminobenzoic acid and other amino acids, such as glycine, aspartic acid, leucine, alanine, isovaline, cysteine, and the like, are also important intermediates of the present invention. The amino acids may be natural or synthetic and may be in any of the d, l, or dl forms. As these amino acid amides possess free carboxyl groups, it will be apparent that the salts and esters thereof may likewise be employed.

The reaction may be conducted by mixing all of the three essential retactants together at the same time or the halopyruvicaldehyde may be first reacted with one of the other two reactants before adding the third to the reaction mixture.

The reaction may take place over a wide range of temperatures, from about 15° C. up to 100° C. or higher. Likewise, the reaction will take place under a wide range of pH conditions, there appearing to be no limiting acidity or alkalinity. Best results appear to be obtained, however, within the range of pH 3 to pH 5.

The reaction is usually conducted with the reactants dissolved or suspended in a solvent such as water, ethyl alcohol, acetone, benzene, carbontetrachloride, chloroform, etc. or mixtures thereof.

The invention will now be described in greater particularity by means of the following examples in which various reaction conditions are illustrated.

*Example 1*

A solution of 13 g. ethyl γ,γ-diethoxy aceto acetate in 68 cc. of 1 N potassium hydroxide was refluxed for about 20 minutes. The mixture was then extracted with ether and the dried ethereal solution was evaporated to remove ether. The oily residue was then fractionated in vacuo. A yield of 5.25 g. of pyruvic aldehyde acetal, boiling point 67°–68° C. at 25 mm./Hg, was obtained.

To a well stirred mixture of 1 g. pyruvic aldehyde acetal, 1 g. of anhydrous sodium carbonate and 10 cc. of carbon disulphide was added a solution of 0.352 cc. of bromine in 4 cc. of carbon disulphide. When all of the bromine had reacted the solution was decanted from the sodium salts and evaporated in vacuo. The residue was taken up in dry ether and washed with a little sodium bicarbonate solution. The ether solution was then dried and evaporated in vacuo. The residual oil was distilled in vacuo in a molecular still. The product obtained was bromopyruvic aldehyde acetal.

The bromo compound obtained from 0.5 g. of pyruvic aldehyde acetal was dissolved in a little absolute ethanol and added to a hot (90° C.) solution of 1 g. of para-aminobenzoylglutamic acid and 1 g. of sodium carbonate in 20 cc. of water. A portion of the cooled solution was then reacted with an aqueous solution of 2,4,5-triamino-6-hydroxypyrimidine. The mixture was acidified with acetic acid and allowed to stand at room temperature for one hour. The product obtained was biologically active and had the following formula:

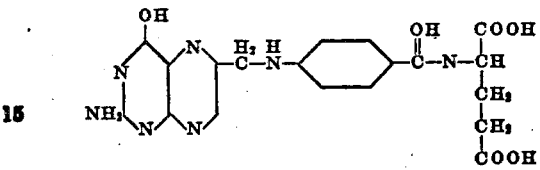

N-[4-{-[(2-amino-4-hydroxy-6-pyrimido[4,5-b]pyrazyl) methyl]-amino}-benzoyl] glutamic acid is the name given this material under the Ring Index system of naming.

*Example 2*

The bromo pyruvic aldehyde acetal obtained from the bromination of 0.5 g. of pyruvic aldehyde acetal was dissolved in a little absolute ethanol and added to a hot (90° C.) solution of 1 g. of para-aminobenzoylglutamic acid and 1 g. of sodium carbonate in 20 cc. of water. A small amount of the cooled solution was acidified with hydrochloric acid and allowed to stand one-half hour. At the end of that time an aqueous solution of 2,4,5-triamino-6-hydroxy-pyrimidine was added. The product was found to be effective in stimulating the growth of *Streptococcus fecalis* R. and *Lactobacillus casei*. It was found to be identical with product obtained in Example 1.

*Example 3*

A solution of 0.6 g. of para-aminobenzoyldiethylglutamate in 10 cc. of warm absolute ethanol was treated with a solution of 0.202 g. of distilled bromopyruvic aldehyde acetal in 1 cc. of absolute alcohol, and the mixture was heated on the steam bath under reflux conditions for about 10 minutes. After removing two-thirds of the alcohol in vacuo, the cooled residual solution was then treated with a solution of 0.13 g. of 2,4,5-triamino-6-hydroxypyrimidine in 10 cc. of water and 0.5 cc. of glacial acetic acid. The mixture was warmed for a few minutes and then allowed to stand at room temperature for six hours. The pH of the mixture was about 3–4.

The reaction mixture which contained considerable brownish precipitate was made up to 25 cc. volume with water. A 20 cc. portion of this mixture was centrifuged and the solid was then dissolved in warm, dilute alkali and reprecipitated at about ph 3 with hydrochloric acid. The precipitate was washed with water, alcohol and ether. The product was the same as that of Example 1.

*Example 4*

A solution of 0.225 g. of bromopyruvic aldehyde acetal in 1 cc. of absolute alcohol was added simultaneously with a solution of 0.141 g. of 2,4,5-triamino-6-hydroxypyrimidine in 2 cc. of water and 0.5 cc. of concentrated hydrochloric acid, to a solution of 0.266 g. of para-aminobenzoylglutamic acid in 3 cc. of hot water. About 2–3 cc. of ethanol was added to increase the solubility of the acetal. After 2 hours at room temperature the mixture was made alkaline with sodium hydroxide and then acidified to pH of about 2 with hydrochloric acid. The precipitate was collected, washed with water, alcohol and ether. The product was identical with that of Example 1.

As previously stated, identical products are obtained when using the halopyruvicaldehyde in place of the acetal and when using the tautomeric 2,4,5-triaminopyrimidone-6 in place of 2,4,5-triamino-6-hydroxypyrimidine.

Related products are obtained when using other aminobenzoyl derivatives in place of para-aminobenzoylglutamic acid in the process of the preceeding examples.

I claim:

1. The method which comprises mixing together in a solvent 2,4,5-triamino-6-hydroxy pyrimidine, a member of the group consisting of halopyruvic aldehyde and acetals thereof, and a member of the group consisting of aminobenzoic acid and its salts, esters and amides thereof and after reaction recovering the resulting pterin.

2. A method of preparing compounds having the general formula:

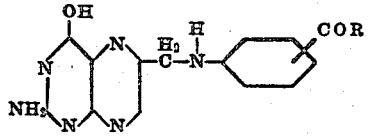

in which R is a member of the group consisting of

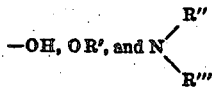

radicals in which R' is an alkyl radical and R'' and R''' are hydrogen, aliphatic or aromatic radicals which comprises mixing together in a solvent 2,4,5-triamino-6-hydroxy-pyrimidine, a member of the group consisting of halopyruvic aldehyde and acetals thereof and a member of the group consisting of aminobenzoic acids and its salts, esters and amides and after reaction thereof recovering a pterin having the said formula.

3. A method of preparing compounds having the general formula:

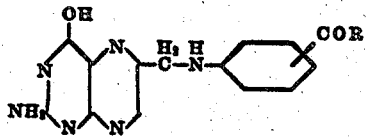

in which R is a member of the group consisting of

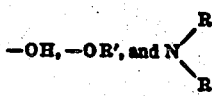

radicals in which R' is an alkyl radical and R'' and R''' are hydrogen, aromatic or aliphatic radicals which comprises mixing together in a solvent 2,4,5-triamino-6-hydroxypyrimidine and a member of the group consisting of halopyruvic aldehyde and acetals thereof, and thereafter adding to the reaction mixture a member of the group consisting of aminobenzoic acid and salts, esters, and amides thereof and after reaction recovering a pterin having the said formula.

4. A method of preparing compounds having the general formula:

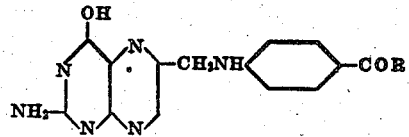

in which R is a member of the group consisting of

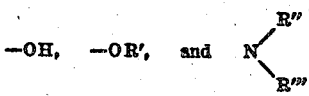

radicals in which R' is an alkyl radical and R'' and R''' are hydrogen, aliphatic or aromatic radicals which comprises mixing together in a solvent a member of the group consisting of halopyruvic aldehyde and acetals thereof and a member of the group consisting of aminobenzoic acid and salts, esters, and amides thereof and thereafter adding to the reaction mixture 2,4,5-triamino-6-hydroxypyrimidine and after reaction thereof recovering a pterin having the said formula.

5. A method of preparing compounds having the general formula:

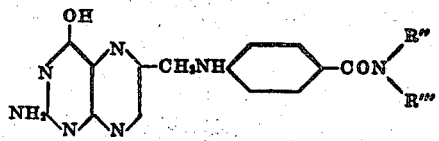

in which R'' and R''' are members of the group consisting of hydrogen, aliphatic and aromatic radicals which comprises mixing together in a solvent at a pH within the range of about 3 to 5 2,4,5-triamino-6-hydroxypyrimidine, a halopyruvic aldehyde and an amide of p-aminobenzoic acid, heating the mixture and after reaction thereof recovering a pterin having the said formula.

6. A method in accordance with claim 5 in which the amide of p-aminobenzoic acid is p-aminobenzoyl-glutamic acid.

7. A method in accordance with claim 5 in which the amide of p-aminobenzoic acid is p-aminobenzoyl-aspartic acid.

8. A method in accordance with claim 5 in which the amide of p-aminobenzoic acid is p-aminobenzoyl-glutamylglutamic acid.

JOHN H. MOWAT.